Figure 1:
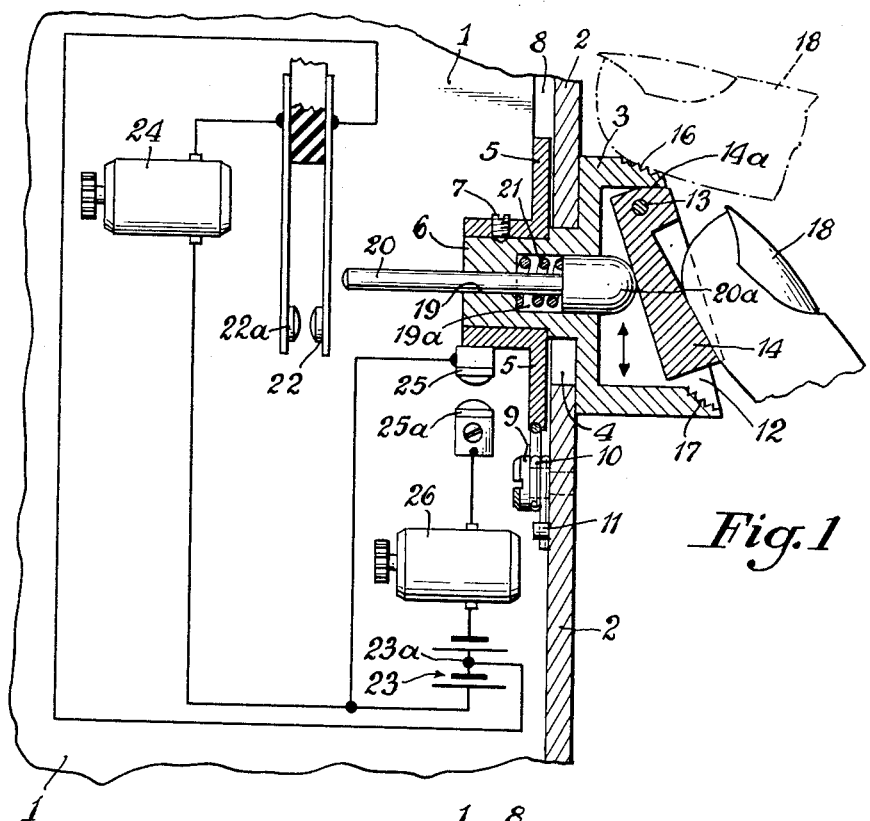

June 1, 1965                R. HOCHSTEIN                3,186,319
                        CAMERA RELEASE DEVICE
                        Filed Aug. 29, 1962

United States Patent Office 3,186,319
Patented June 1, 1965

3,186,319
CAMERA RELEASE DEVICE
Roland Hochstein, Kiel-Wik, Germany, assignor to Zeiss Ikon Aktiengesellschaft, Stuttgart, Germany
Filed Aug. 29, 1962, Ser. No. 220,209
Claims priority, application Germany, Sept. 8, 1961, Z 8,959
9 Claims. (Cl. 95—10)

The invention relates to a camera release device particularly suitable for a motion picture camera which is equipped with a disconnectable automatic exposure mechanism.

As a result of the continuously advancing automation in exposure adjusting devices for photographic devices, there have been made numerous constructions for adjusting the correct exposure values. In most of the proposed arrangements an exposure adjusting means is provided, for instance a diaphragm, which depending upon the prevailing light conditions and other already adjusted exposure factors, such as the shutter speed and the film speed, effects an automatic adjustment of the diaphragm aperture. In these arrangements there is no possibility to change the exposure adjustment, for instance in a manner which does not conform to the prevailing light conditions.

An automatic exposure mechanism is known which employs for the purpose of applying an increased amount of power to the adjusting device an additional source of current and a so called photo resistance. Such an exposure mechanism has the disadvantage that the source of current which operates the control device and energizes the photo resistance is very quickly exhausted when the camera provided with such an automatic exposure mechanism is, for instance, exhibited in a show window or is subjected to a continuous stream of light when carried in an open carrying case. The energy of the source of current is sometimes exhausted even before a single exposure has been made.

It is an object of the present invention to overcome these disadvantages by combining a switch for connecting and disconnecting the automatic exposure mechanism with the camera release device and providing a single finger element therefor.

In accordance with another object of the invention this finger element consists of a button which is provided with a cavity and is movable along a slot provided in the camera wall. The cavity is provided with a pivotally mounted plate and this plate is used for actuating a pin which is axially movably mounted along the axis of the finger button and is adapted to actuate a switch for connecting and disconnecting the automatic exposure mechanism.

In order to operate the automatic exposure mechanism together with the camera release mechanism, the camera user engages with one finger the finger button and also the plate pivotally mounted within the same so that he is able to bring the camera into the release position. When this takes place, the plate is moved away from its normally inoperative position and actuates a pin which in turn renders the automatic exposure mechanism operative. This has the result that prior to the exposure of the film in the camera the correct exposure value is adjusted and is constantly readjusted during the operation of the camera.

With these and other objects in view the invention will now be described with reference to the drawings which illustrate one embodiment of the invention.

Figure 2:
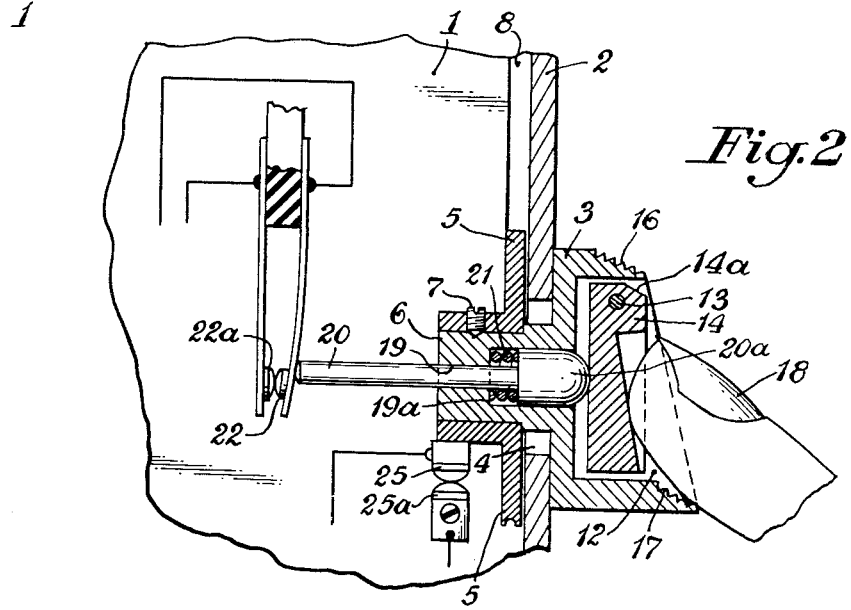

In the drawings:

FIG. 1 illustrates a sectional view of the camera release device in its inoperative position whereby certain parts of the camera are shown in a simplified manner, and FIG. 2 illustrates the camera release device in its operative position.

Referring to the drawing, a side wall 2 of the camera casing 1 is provided with a vertically extending slot 4 in which a finger button 3 is slidably movable transversely to its own axis. A slide 5 is fixedly attached to the inwardly extending hub 6 of the finger button 3 by means of a set screw 7. This slide 5 is slidably supported in a vertical guide 8 provided on the inner face of the side wall 2 so that only a slidable movement of the finger button 3 transversely to its axis is possible while any rotative movement of this finger button 3 is prevented. A torsion spring 10 is coiled around a fixed pin or screw 9. One end of this torsion spring 10 engages the lower end of the slide 5 on the finger button 3 and the other end of the torsion spring 10 engages an abutment pin 11 on the inner face of the sidewall 2 so that as a result of this spring arrangement the torsion spring 10 has always the tendency to move the slide 5 and thereby the finger button 3 in an upward direction within the slot 4.

The finger button 3 is provided with a cavity 12, and a plate 14 is pivotally mounted in this cavity about a pin 13 which is spaced from the axis of the button 3 and extends transversely to this axis. The finger button 3 is provided at its upper portion with an outer rough surface 16 for engagement with the finger of the camera user, and the lower portion of the cavity 12 is provided with another rough surface 17 which is also adapted to be engaged by the finger of the camera user. In order that the finger 18 of the camera user may conveniently engage the mentioned rough portions 16 and 17 and also the plate 14 within the cavity 12, the outer end face of the finger button 3 extends at an angle to the axis of the button 3 in such a manner that the lower rough surface 17 extends farther away from the camera wall 2 than the upper rough surface 16. The upper end of the plate 14 is provided with a bevel 14a which limits the outward pivotal movement of the plate 14 when engaging the upper inner portion of the cavity wall, as shown in FIG. 1.

The finger button 3 is provided with an axial bore 19 and a counter bore 19a for slidably receiving a pin 20 and its outer enlarged end 20a. The counter bore 19a also includes a coil spring 21 which normally urges the pin 20 outwardly in engagement with the rear face of the pivotally mounted plate 14, as shown in FIG. 1. The pin 20 is adapted to engage with its left hand end a switch comprising two contacts 22 and 22a. This switch is arranged in a circuit which not only contains a battery 23 mounted within the camera casing 1 but also a diaphragm adjusting motor 24. Furthermore, the finger button 3 which is slidable in the slot 4 carries a contact 25 adapted to engage another contact 25a arranged in an electric circuit which contains a motor 26 for operating the film advancing mechanism and the shutter of the camera. The motor 26 is also mounted in the camera and is driven by the battery 23. Since the diaphragm adjusting motor 24 requires much less energy to be driven than the motor 26, only about one half of the voltage of the battery 23 is required and therefore the battery is tapped for this reduced voltage at 23a.

In FIG. 1 the camera release mechanism is illustrated in its inoperative position and the finger 18 of the camera user, as shown in full lines, is just about ready to push the pivotally mounted plate inwardly and also to actuate the finger button 3 at the same time. FIG. 1 also shows in dash-and-dotted lines the position of the finger 18 when only the upper rough surface 16 on the finger button 3 is to be engaged. This dash-and-dotted line illustration of the finger 18 indicates that position when only the motor 26 is to be set into operation while the exposure mechanism remains inoperative. When the finger button 3 is pushed downwardly solely by pressing upon the rough surface 16, only the motor 26 is set into operation.

In FIG. 2 the camera release device is illustrated in its operative position. It will be noted that not only the automatic exposure mechanism has been rendered operative by closing the contacts 22, 22a, but that also the film advancing mechanism, namely the motor 26, is operating. It is evident that it is very easy to perform both operations by letting the finger 18 engage the plate 14 and the lower rough surface 17 of the button 3.

The control element of the automatic exposure mechanism is not shown because its illustration does not appear to be necessary for an understanding of the present invention.

What I claim is:

1. In a camera release device, particularly for a motion picture camera provided with a disconnectable automatic exposure mechanism arranged in an electric circuit, a switch in said electric circuit of said exposure mechanism, a camera release means, and a single manually actuated means selectively operable for opening and closing said switch and for controlling said camera release means independently and in unison, said manually actuated means comprising a finger button arranged slidably along a wall of the camera casing and a finger operable plate pivotally mounted in a cavity of said finger button.

2. In a camera release device, particularly for a motion picture camera provided with a disconnectable automatic exposure mechanism arranged in an electric circuit, a switch in said electric circuit of said exposure mechanism, a camera release means, and a single manually actuated means selectively operable for opening and closing said switch and for controlling said camera release means in unison and independently, said manually actuated means comprising a finger button arranged slidably along a wall of the camera casing and a finger operable plate pivotally mounted in a cavity of said finger button, said finger button having a spring influenced pin axially slidably mounted therein, said pin engaging with one end the rear face of said plate while the other end of said pin is adapted to engage said switch.

3. A camera release device according to claim 1, including contact elements controlled by said slidable finger button for closing an electric circuit which operates said camera release means, and means actuated by said finger operable plate for controlling said switch.

4. In a camera release device, particularly for a motion picture camera provided with a disconnectable automatic exposure mechanism arranged in an electric circuit, a switch in said electric circuit of said exposure mechanism, a camera release means, and a single manually actuated means selectively operable for opening and closing said switch and for controlling said camera release means in unison and independently, said manually actuated means comprising a finger button slidably arranged along a wall of the camera casing, a plunger engageable with said switch slidably mounted in said plate, a finger operable plate pivotally mounted in a cavity of said finger button, and means for limiting the pivotal movement of said finger operable plate to prevent displacement of said plunger.

5. A camera release device according to claim 1, in which said finger button is provided on two diametrically opposed points with roughened finger engaging portions of which one is arranged adjacent the free end of said plate at the inner edge of said cavity.

6. A camera release device according to claim 1, in which said plate is provided with a smooth concave finger engaging surface.

7. A camera release device according to claim 1 in which said finger button is provided with an outer inclined end face.

8. In a camera release device, particularly for use in a motion picture camera provided with a disconnectable automatic exposure mechanism arranged in an electric circuit, a source of electrical energy in said circuit, a switch in said circuit of said exposure mechanism in a normally open position, a camera release means, a slide movably mounted in a slot in one wall of said camera, a finger engaging plate pivotally mounted in said slide and located in a recess therein, a plunger in said slide yieldingly urged in the direction of said finger engaging plate, means on said finger plate to limit the outlet movement of said plunger, the other end of said plunger being adapted to engage said switch and close said circuit to control said exposure mechanism, said slide being provided with finger engaging portions to move the same independently to control said camera release means, whereby said exposure mechanism and camera release means can be manually actuated by selectively operating the slide and finger engaging plate and can be operated in unison by the simultaneous movement of said slide and plate.

9. In a camera release device, for use in a motion picture camera provided with a disconnectable automatic exposure mechanism including an electric motor, a circuit for said motor having a source of electrical energy, a normally open switch in said circuit, a camera release means including a film advancing and shutter mechanism motor, a circuit for said last named motor having a source of electrical energy, a normally open switch in said circuit, a slide movably mounted in a slot in one of the walls of said camera, an actuating button on said slide having finger engaging portions and a central cavity, a finger engaging plate pivotally mounted in said cavity to swing about an axis normal to the axis of said slide, a plunger mounted in said slide, yielding spring means urging said plunger in a direction toward said finger engaging plate, stop means for limiting movement of said finger engaging plate and retaining said plunger in position, the other end of said plunger being arranged to engage said normally open contacts when the finger engaging plate is depressed and said second normally open switch being adapted to be closed upon movement of said slide along said camera wall slot, whereby depression of said finger engaging plate and sliding movement of said button can be selectively controlled to operate said motors independently and in unison.

References Cited by the Examiner

UNITED STATES PATENTS

| 2,024,661 | 12/35 | Riszdorfer | 95—10 |
| 2,969,722 | 1/61 | Schwartz | 95—31 |
| 3,085,487 | 4/63 | Akahane | 352—141 |

FOREIGN PATENTS

| 213,438 | 5/41 | Switzerland. |

NORTON ANSHER, *Primary Examiner.*

D. B. LOWE, *Examiner.*